(12) United States Patent
Sabraoui et al.

(10) Patent No.: US 12,477,253 B2
(45) Date of Patent: Nov. 18, 2025

(54) AUTOMATED COLLECTION OF METERING INDEX OF SMART FLUID METERS

(71) Applicant: SAGEMCOM ENERGY & TELECOM SAS, Rueil Malmaison (FR)

(72) Inventors: Abbas Sabraoui, Rueil Malmaison (FR); Henri Teboulle, Rueil Malmaison (FR); Oussama Abid, Rueil Malmaison (FR); Guillaume Lecocq, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 142 days.

(21) Appl. No.: 17/686,032

(22) Filed: Mar. 3, 2022

(65) Prior Publication Data
US 2022/0303647 A1  Sep. 22, 2022

(30) Foreign Application Priority Data

Mar. 22, 2021 (FR) ...................................... 2102834

(51) Int. Cl.
*H04W 4/38* (2018.01)
*G07F 15/00* (2006.01)
*H04Q 9/00* (2006.01)
*H04W 24/02* (2009.01)
(Continued)

(52) U.S. Cl.
CPC ................ *H04Q 9/00* (2013.01); *H04W 4/38* (2018.02); *H04W 24/02* (2013.01); *H04Q 2209/43* (2013.01); *H04Q 2209/60* (2013.01)

(58) Field of Classification Search
None
See application file for complete search history.

(56) References Cited

U.S. PATENT DOCUMENTS

| 2006/0056363 | A1 | 3/2006 | Ratiu et al. | |
| 2009/0115626 | A1* | 5/2009 | Vaswani | G01D 4/004 340/870.02 |
| 2010/0278187 | A1* | 11/2010 | Hart | H04L 69/18 370/469 |

FOREIGN PATENT DOCUMENTS

JP  2005110288 A * 4/2005 ........... G08B 25/009

OTHER PUBLICATIONS

JP-2005110288-A English Language Translation (Year: 2005).*
(Continued)

*Primary Examiner* — Curtis A Kuntz
*Assistant Examiner* — Jerold B Murphy
(74) *Attorney, Agent, or Firm* — Williams Mullen; R. Brian Drozd

(57) ABSTRACT

A gateway acts as an intermediary between a plurality of smart fluid meters and an information system responsible for collecting metering index readings made by said smart fluid meters. The gateway is connected to the information system by a first communication network, and the gateway is connected to first smart fluid meters from said plurality by means of a second long-range radio communication network, said first smart fluid meters being able to act as relays for second smart fluid meters by means of a third short-range radio communication network. The gateway selects one or more first smart fluid meters as relays, according to the battery charge levels obtained, and configures the second communication network accordingly.

19 Claims, 5 Drawing Sheets

(51) Int. Cl.
*H04W 40/10* (2009.01)
*H04W 40/22* (2009.01)

(56) References Cited

OTHER PUBLICATIONS

Oct. 28, 2021 Search Report issued in French Patent Application No. FR 2102834.

L. Wan et al.; "Demonstrability of Narrowband Internet of Things Technology in advanced metering infrastructure"; Eurasip Journal on Wireless Communications and Networking; 2019; vol. 2; pp. 1-12.

T. Nghia et al.; "Advanced Metering Infrastructure Based on Smart Meters in Smart Grid"; Smart Metering Technology and Services-Inspirations for Energy Utilities; 2016; Chapter 3; pp. 37-61.

* cited by examiner

AUTOMATED COLLECTION OF METERING INDEX OF SMART FLUID METERS

TECHNICAL FIELD

The present invention relates to operations of configuring a communication system for making an automated collection of metering index readings of smart fluid meters using at least one smart fluid meter as relay for at least one other smart fluid meter.

PRIOR ART

Smart fluid meters are known, of the gas, thermal-energy or water meter type, which comprise radio communication interface means enabling an automated management system to make a remote collection of metering index readings of smart fluid meters.

For example, each of these smart fluid meters comprises a communication interface compatible with a Low-Power Wide-Area Network (LPWAN) technology, for example in accordance with the LoRaWAN (Long-Range Wide-Area Network) or NB-IoT (NarrowBand Internet of Things) technology. All the smart fluid meters then transmit their metering index readings by radio using a long-range radio network managed by gateways that furthermore provide a transfer of these metering index readings to a computer system processing them in a centralised manner.

Unlike smart electricity meters, these smart fluid meters are not mains powered. They have a battery for operating and for in particular making it possible to establish radio communications in order to institute the remote automated management.

It is therefore desirable to provide a solution that is effective in energy terms in the context of an automated management of smart fluid meters powered by battery. It is in particular desirable to provide a solution that is simple and low cost. It is also desirable to provide a solution that facilitates the installation and the maintenance of the automated management of smart fluid meters.

DISCLOSURE OF THE INVENTION

For this purpose, a method is proposed for configuring a communication network by a gateway acting as an intermediary between a plurality of smart fluid meters and an information system responsible for collecting metering index readings made by the smart fluid meters, the gateway being connected to the information system by a first communication network, the gateway being connected to first smart fluid meters among said plurality by means of a second long-range radio communication network, said first smart fluid meters being able to act as relays for second smart fluid meters by means of a third short-range radio communication network, wherein the gateway performs the following steps: obtaining, via the second long-range radio communication network, battery charge levels of the first smart fluid meters; selecting one or more first smart fluid meters as relays, according to the battery charge levels obtained, favouring the first smart fluid meters the battery charge level of which is the highest; configuring the second long-range radio communication network, instructing the first smart fluid meters selected as relays to activate their relay functionality and instructing any former relays that have not once again been selected as relays to deactivate their relay functionality; monitoring the battery charge levels of the first smart fluid meters and re-evaluating the configuration of the second long-range radio communication network accordingly. Thus it is possible to extend the range of the automated management system while using relays relying on a shorter-range communication network (less greedy of energy), while taking account of the battery charge level of these relays in order to balance the expenditure of energy.

According to a particular embodiment, the gateway selects as relay each first smart fluid meter the battery charge level of which is higher than a first predetermined threshold.

According to a particular embodiment, wherein the gateway performs the following steps: making, during exchanges with the first smart fluid meters via the second long-range radio communication network, measurements of reception quality of signals coming from the first smart fluid meters; selecting one or more first smart fluid meters as relays, according furthermore to the measurements of reception quality of signals made, favouring the first smart fluid meters for which the signal reception quality is the highest; monitoring the reception quality of signals transmitted by the first smart fluid meters in the second long-range radio communication network, and re-evaluating the configuration of the second long-range radio communication network accordingly.

According to a particular embodiment, the gateway selects as relays each first smart fluid meter for which the quality of reception of signals by the gateway is above a second predetermined threshold.

According to a particular embodiment, the second smart fluid meters are paired with the first smart fluid meters acting as relays for said second smart fluid meters, performing the following steps: each second smart fluid meter, in a pairing mode, sends announcement frames until a response is received from a first smart fluid meter acting as relay; each first smart fluid meter acting as relay in pairing mode and within radio range of the third short-range radio communication network responds to at least one announcement frame received and pairs with the second smart fluid meter that sent the announcement frame responded to.

According to a particular embodiment, at least a said second smart fluid meter switches into pairing mode when a triggering of metering is detected for the very first time.

According to a particular embodiment, at least one said second smart fluid meter switches into pairing mode following a loss of synchronisation with a previous relay.

According to a particular embodiment, a said relay switches into pairing mode when a pressing on a man-machine interface button of the relay in question is detected or when specific instructions are received via an infrared connector of the relay in question.

According to a particular embodiment, the detection of a pressing on the interface button during a period lying between a minimum bound and a maximum bound instructs the relay in question to switch into pairing mode so as to enable a single second smart fluid meter to pair, and the detection of a pressing on the interface button during a period greater than the maximum bound instructs the relay in question to switch to pairing mode during a predetermined period.

According to a particular embodiment, a said relay switches to pairing mode when instructions are received from the gateway to activate or to maintain the relay functionality.

According to a particular embodiment, each relay collects, via the third short-range radio communication network, the battery charge level of each second smart fluid meter that is paired with it and informs the gateway of this, the gateway alerting the information system when the battery charge level of a smart fluid meter is below a predetermined alert threshold.

According to a particular embodiment, when a first smart fluid meter that acted as a relay and is no longer one detects that at least one second smart fluid meter is isolated and is no longer paired, the first smart fluid meter automatically reactivates its relay functionality, enables each second smart fluid meter in question to make a pairing and warns the gateway that it is once again acting as a relay.

According to a particular embodiment, when a relay loses its connection with the gateway via the second long-range radio communication network, the relay in question automatically deactivates the relay functionality, resumes its simple role of a smart fluid meter, and itself seeks to be paired with another relay.

The invention also relates to a computer program that can be stored on a medium and/or downloaded from a communication network, in order to be read by a processor. This computer program comprises instructions for implementing the method mentioned above in any one of the embodiments thereof, when said program is executed by the processor.

The invention also relates to an information storage medium storing such a computer program.

A gateway is also proposed, configured for acting as an intermediary between a plurality of smart fluid meters and an information system responsible for collecting metering index readings made by said smart fluid meters, the gateway being configured for being connected to the information system by a first communication system and for being connected to first smart fluid meters among said plurality by means of a second long-range radio communication network, said first smart fluid meters being able to act as relays for second smart fluid meters in said plurality by means of a third short-range radio communication network, the gateway comprising electronic circuitry configured for: obtaining, via the second long-range radio communication network, battery charge levels of the first smart fluid meters; selecting one or more first smart fluid meters as relays, according to the battery charge levels obtained, favouring the first smart fluid meters the battery charge level of which is the highest; configuring the second long-range radio communication network, instructing the first smart fluid meters selected as relays to activate their relay functionality and instructing any former relays that have not once again been selected as relays to deactivate their relay functionality; monitoring the battery charge levels of the first smart fluid meters and re-evaluating the configuration of the second long-range radio communication network accordingly.

An automated management system is also proposed, for collecting metering index readings made by smart fluid meters in said system, the system further comprising an information system and a gateway as mentioned above.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
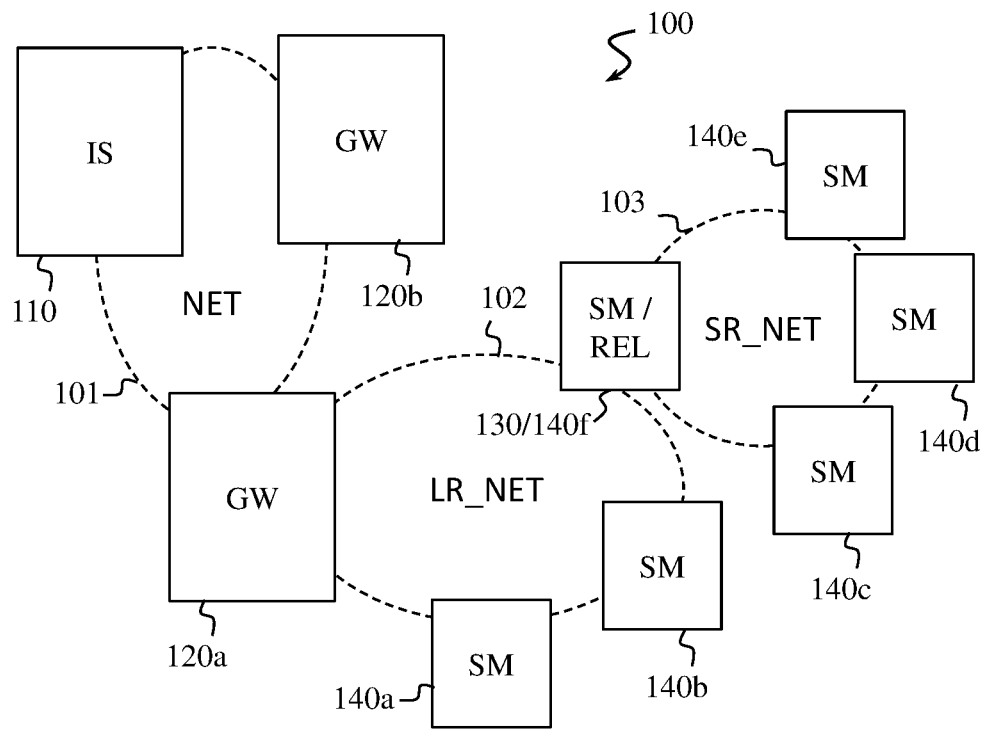
FIG. 1 illustrates schematically an automated management system configured for making a metering reading on smart fluid meters.

FIG. 1 thus illustrates schematically an automated management system 100 configured for making a metering reading on smart fluid meters SM. The smart fluid meters SM are for example gas consumption meters, thermal energy consumption meters or water consumption meters or for any other type of fluid the consumption of which can be measured, which have the ability to communicate by radio transmission. The smart fluid meters SM are electrically powered by battery, i.e. with a limited amount of energy in reserve.

The automated management system 100 comprises an information system IS 110 the role of which is to monitor metering operations performed by the smart fluid meters SM. To do this, the information system IS 110 delegates the management of a gathering network to gateways GW. Two gateways GW 120a, 120b are shown in FIG. 1 by way of example. The automated management system 100 typically comprises a larger number of such gateways GW. The information system IS 110 takes the form of a server, or a set of servers, which exchanges with the gateways GW 120a, 120b by means of a communication network NET 101. For example, the communication network NET 101 is the internet. The communication network NET 101 is for example a wireless communication network, for example of the GPRS (General Packet Radio Service), UMTS (Universal Mobile Telecommunication System) or LTE (Long-Term Evolution) type.

Each gateway GW 120a, 120b manages the communications with a set of smart fluid meters SM by means of a communication network LR_NET 102. The communication network LR_NET 102 is a long-range wireless communication network. Preferentially, the communication network LR_NET 102 is a low-power wide-area network LPWAN, for example in accordance with the LoRaWAN or NB-IoT technology.

By means of the communication network LR_NET 102, the gateway GW 120a communicates directly with smart fluid meters SM 140a, 140b. The gateway GW 120a communicates directly also with a smart fluid meter SM 140f, to which the gateway GW 120a attributed a role of relay REL 130. The relay REL 130 serves as an intermediary between on the one hand the gateway GW 120a and the information system IS 110 and on the other hand other smart fluid meters SM 140*c*, 140*d*, 140*e*. These other smart fluid meters SM 140*c*, 140*d*, 140*e* do not for example have a communication interface compatible with the communication network LR_NET 102. This arrangement is particularly advantageous in the case of small collectives in which some of the smart fluid meters SM comprise an interface compatible with the communication network SR_NET 103 but no interface compatible with the communication network LR_NET 102 and therefore require the use of a relay, whereas other smart fluid meters SM comprise both interfaces.

Thus the relay REL 130 periodically collects and sends, for example from one to several times a day, to the information system IS 110, metering index data of the smart fluid meters SM 140*c*, 140*d*, 140*e* that are paired with it.

To communicate with the smart fluid meters SM 140*c*, 140*d*, 140*e*, the relay REL 130 manages a communication network SR_NET 103. The communication network SR_NET 103 is a short-range wireless communication network with a shorter radio range than the communication network LR_NET 102. A communication interface with the communication network SR_NET 103 thus consumes less energy than a communication interface with the communication network LR_NET 102 for the same quantity of payload to be transmitted. Preferentially, the communication network SR_NET 103 is a network in accordance with the WM-Bus standard, as defined in NF EN 13757-4, *"Communication systems for meters and remote reading of meters—Part 4: Wireless meter readout (Radio meter reading for operation in SRD bands)"*. The WM-Bus standard is a wireless communication standard offering an excellent compromise between small antenna size and long radio range both indoors and outdoors (up to 1 km without repeaters). However, in variant embodiments, the communication network SR_NET 103 is in accordance with another wireless communication technology, such as for example BLE (Bluetooth Low Energy) or ZigBee.

Figure 2:
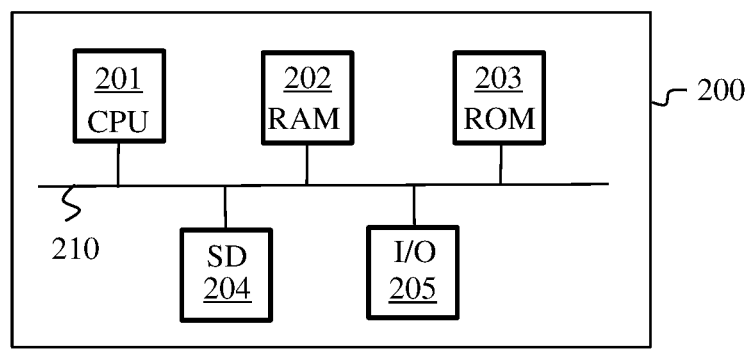
FIG. 2 illustrates schematically an example of hardware architecture of a device in the automated management system.

FIG. 2 illustrates schematically an example of hardware architecture of a device 200 of the automated management system 100. The device 200 is the gateway GW 120*a*, according to one embodiment. The device 200 is a smart fluid meter SM able to adopt the role of relay REL, according to another embodiment. The device 200 is the information system IS 110, according to yet another embodiment.

The device 200 comprises, connected by a communication bus 210: a processor or CPU (central processing unit) 201; a random access memory RAM 202; a read only memory ROM 203, for example a flash memory; a data storage device, such as a hard disk HDD (hard disk drive), or a storage medium reader, such as an SD (Secure Digital) card reader 204; at least one input-output interface I/O 205.

When the device 200 represents the gateway GW 120*a*, the input-output interface I/O 205 includes a communication interface with the communication network NET 101 and a communication interface with the communication network LR_NET 102.

When the device 200 represents a smart fluid meter SM able to adopt the role of relay REL, the input-output interface I/O 205 includes a communication interface with the communication network LR_NET 102 and a communication interface with the communication network SR_NET 103. In addition, the input/output interface I/O 205 includes a metering interface in order to make consumption measurements and to make available a corresponding metering index.

When the device 200 represents the information system IS 110, the input-output interface I/O 205 includes a communication interface with the communication network NET 101.

The processor 201 is capable of implementing instructions loaded in the RAM 202 from the ROM 203, from an external memory (not shown), from a storage medium, such as an SD card, or from a communication network (not shown). When the device 200 is powered up, the processor 201 is capable of reading instructions from the RAM 202 and implementing them. These instructions form a computer program causing the implementation, by the processor 201, of the behaviours, steps and algorithms described here.

All or some of the behaviours, steps and algorithms described here may also be implemented in software form by implementing a set of instructions by a programmable machine, such as a DSP (digital signal processor) or a microcontroller, or be implemented in hardware form by a machine or a dedicated component (chip) or a dedicated set of components (chipset), such as an FPGA (field-programmable gate array) or an ASIC (application-specific integrated circuit). In general terms, the automated management system 100 comprises electronic circuitry arranged and configured for implementing the behaviours, steps and algorithms described here.

Figure 3:
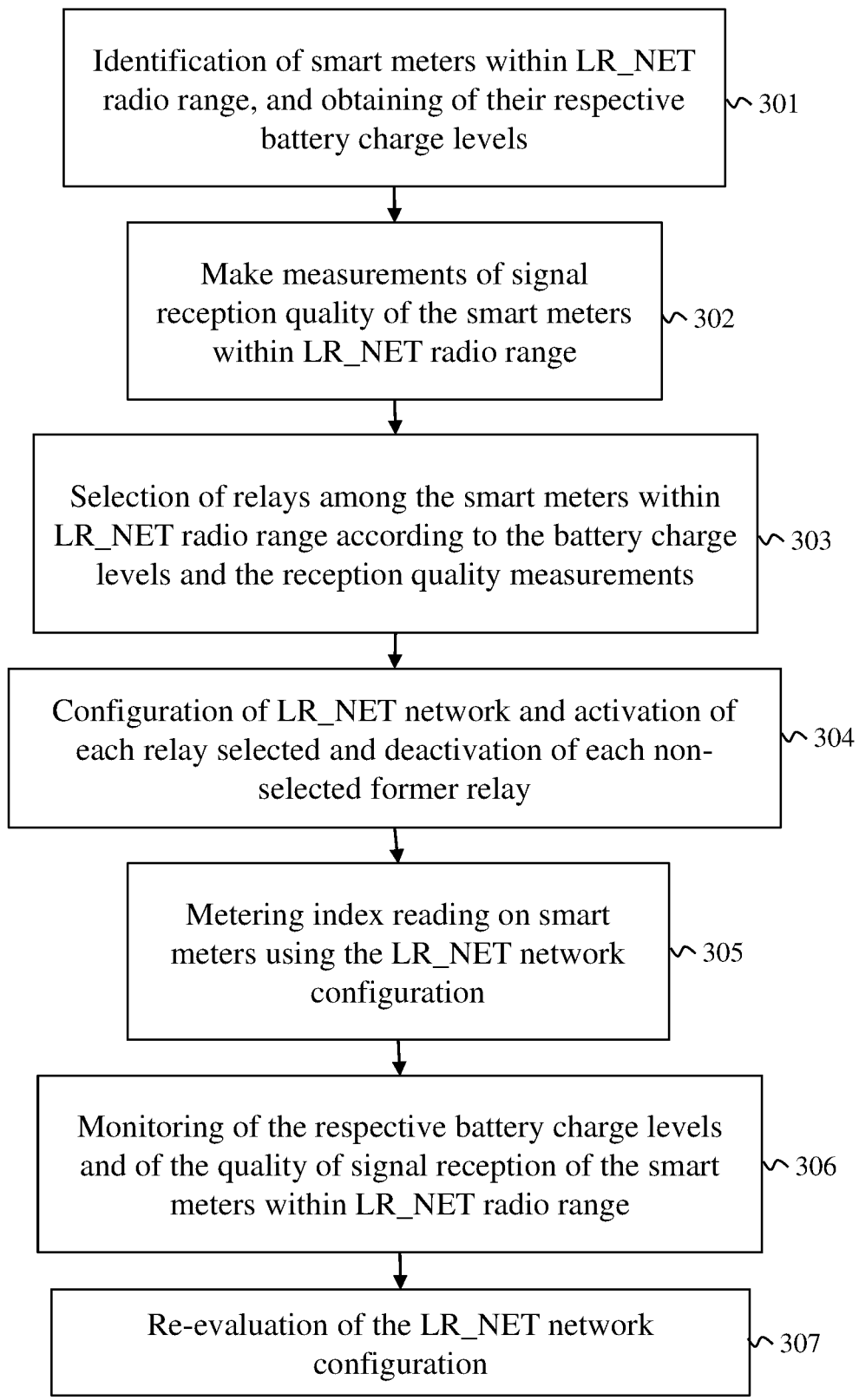
FIG. 3 illustrates schematically an algorithm, implemented by a gateway in the automated management system, for managing configuration of a gathering network.

FIG. 3 illustrates schematically an algorithm implemented by each gateway GW 120*a*, 120*b*. We shall consider the case of the gateway GW 120*a*.

In a step 301, the gateway GW 120*a* exchanges messages in the communication network LR_NET 102 and identifies smart meters within radio range through the communication network LR_NET 102. These are the smart fluid meters SM 140*a*, 140*b*, 140*f* in FIG. 1. From these exchanges, the gateway GW 120*a* obtains, from said smart fluid meters SM 140*a*, 140*b*, 140*f*, their respective battery charge levels. For example, the battery charge level is information coded in one byte and able to adopt the values from 0 to 255, on the understanding that, the higher the value, the longer the remaining life of the battery.

In addition, during these exchanges, the gateway GW 120*a* makes measurements of reception quality of signals coming from these smart fluid meters SM 140*a*, 140*b*, 140*f* within radio range through the communication network LR_NET 102. The gateway GW 120*a* makes these measurements in a step 302. The measurements of reception quality of these signals are preferentially measurements of signal to noise ratio SNR.

In a step 303, the gateway GW 120*a* makes a selection of relays among the smart fluid meters SM 140*a*, 140*b*, 140*f* within radio range through the communication network LR_NET 102, according to the battery charge levels of these smart fluid meters SM 140*a*, 140*b*, 140*f*. The automated management system 100 theoretically comprises sufficient fluid meters that are suitable for acting as relays, for having sufficient redundancies for (theoretically) having at least one alternative when a relay breaks down or has a low battery charge.

The gateway GW 120*a* favours as relay at least one of these smart fluid meters SM 140*a*, 140*b*, 140*f* the battery charge level of which is the highest. Preferentially, the gateway GW 120*a* selects as relay at least one of these smart fluid meters SM 140*a*, 140*b*, 140*f* the battery charge level of which is higher than a predetermined threshold BL_TH. In a particular embodiment, the gateway GW 120*a* selects as relay each smart fluid meter SM 140*a*, 140*b*, 140*f* (within radio range) the battery charge level of which is higher than the predetermined threshold BL_TH.

In a particular embodiment, the gateway GW 120a makes the selection of relays according also to the measurements of reception quality of signals coming from the smart fluid meters SM 140a, 140b, 140f. The gateway GW 120a favours as relay at least one of these smart fluid meters SM 140a, 140b, 140f for which the quality of reception of signals by the gateway GW 120a is the highest. Preferentially, the gateway GW 120a selects as relay at least one of these smart fluid meters SM 140a, 140b, 140f for which, furthermore, the quality of reception of signals by the gateway GW 120a is higher than a predetermined threshold SNR-TH. In one particular embodiment, the gateway GW 120a selects as relay each smart fluid meter SM 140a, 140b, 140f (within radio range) for which, furthermore, the quality of reception of signals by the gateway GW 120a is higher than the predetermined threshold SNR_TH.

In a particular embodiment, the gateway GW 120a knows which smart fluid meters can take the role of relay and for which other smart fluid meters SM (in a given geographical zone), and therefore knows which relays to activate in a complementary manner according to the battery charge levels of any smart fluid meters that may hold the role of relay and according optionally to their signal reception qualities, to ensure that all the smart fluid meters SM expected in the automated management system 100 are adopted.

In a step 304, the gateway GW 120a configures the communication network LR_NET in accordance with the selection of relays made at the step 303. The gateway GW 120a instructs each smart fluid meter SM selected among the smart fluid meters SM 140a, 140b, 140f to activate the relay functionality. The gateway GW 120a instructs each smart fluid meter SM the relay functionality of which has previously been activated but which was not selected in the step 303 to deactivate the relay functionality. Thus, by way of illustration, the smart fluid meter SM 140f is selected by the gateway GW 120a in the light at least of its battery charge level and activates its relay functionality to become the relay REL 130. At least one smart fluid meter SM can then be paired with it to benefit from the relay functionality. Exchanges in this regard are explained below in relation to FIG. 4.

In a step 305, the gateway GW 120a helps to make a metering index reading of the smart fluid meters SM, on behalf of the information system IS 110, by relying on the configuration of the communication network LR_NET established and initiated at the step 304. Thus the metering index reading of the smart fluid meters SM 140c, 140d and 140e is done by means of the relay REL 130. Exchanges in this regard are explained below in relation to FIG. 5.

In a step 306, during its exchanges with the smart fluid meters SM within radio range through the communication network LR_NET, the gateway GW 120a obtains updates relating to their respective battery charge levels. The gateway GW 120a monitors the battery charge levels in order to determine whether the relay selection in the communication network LR_NET must be reviewed, typically after the battery charge level of a smart fluid meter SM within radio range acting as relay falls below the predetermined threshold BL_TH. Preferably, during its exchanges with the smart fluid meters SM within radio range through the communication network LR_NET, the gateway GW 120a obtains updates relating to the quality of reception by the gateway GW 120a of signals coming from said smart fluid meters SM within radio range. The gateway GW 120a monitors the quality of reception of the signals coming from said smart fluid meters SM within radio range in order to determine whether the selection of relays in the communication network LR_NET must be reviewed, typically after the quality of reception of the signals coming from a smart fluid meter SM acting as relay falls below the predetermined threshold SNR_TH.

Thus, when the gateway GW 120a determines that the selection of relays in the communication network LR_NET must be reviewed, the gateway GW 120a re-evaluates the configuration of the communication network LR_NET in a step 307, and reiterates the above steps to select suitable new relays.

Thus, if a smart fluid meter that is acting as relay has its battery charge level drop, the gateway GW 120a will find a substitute relay having a larger reserve of energy (or a better compromise between energy in reserve and signal reception quality). This makes it possible to maintain the service, while triggering actions on site (e.g. battery replacement or recharging) in a suitable manner and keeping the energy available on the battery.

In a particular embodiment, when a smart fluid meter that acted as a relay and is no longer one detects that some smart fluid meters within range thereof (through the third communication network SR_NET 103) are isolated and are no longer paired (transmission of announcement frames without response), it automatically reactivates its relay functionality, enables the smart fluid meters SM in question to implement a pairing and warns the gateway GW 120a that it is once again acting as relay. The gateway GW 120a can then take account of this when it re-evaluates the configuration of the communication network LR_NET at the step 307.

Figure 4:
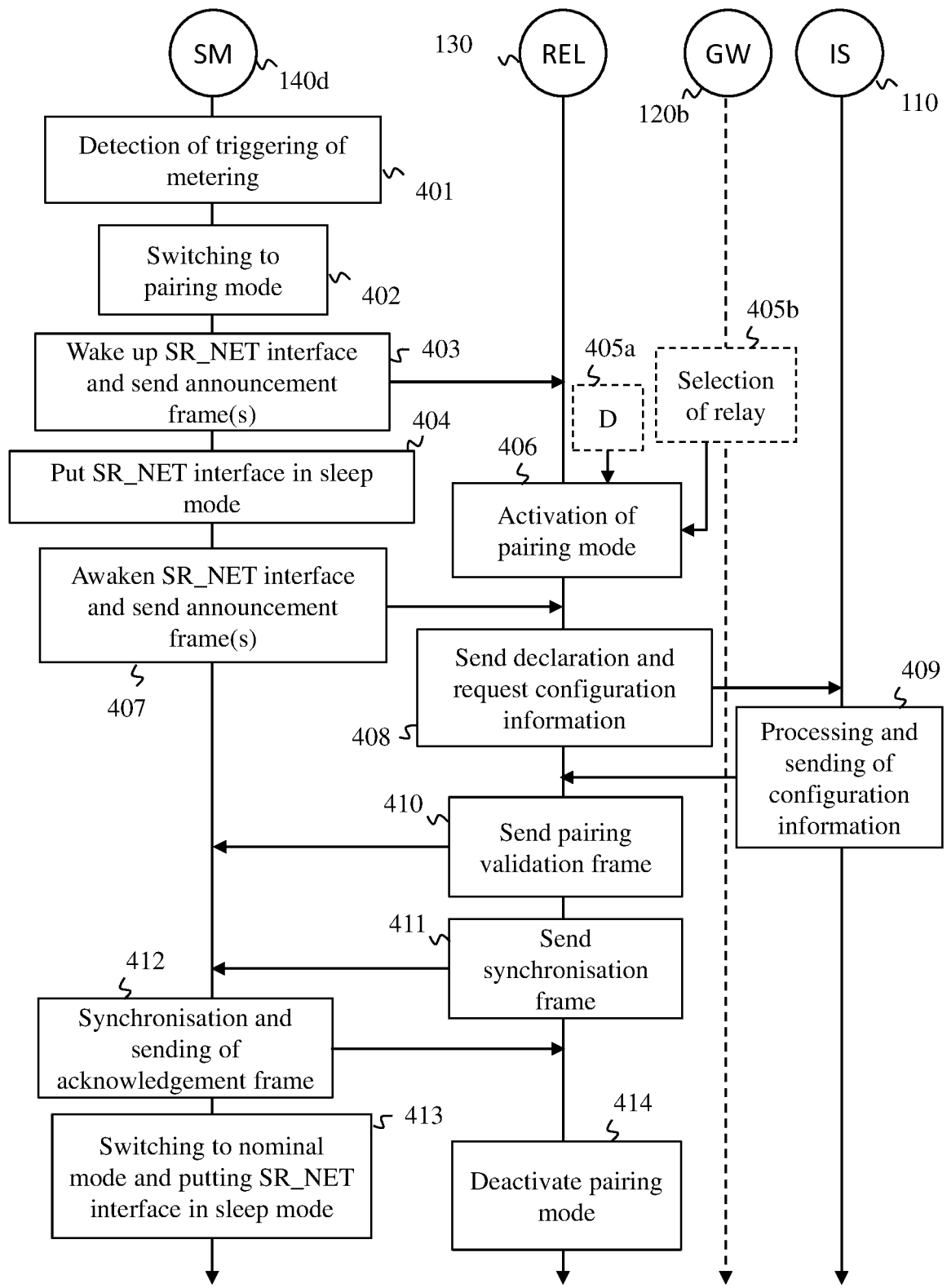
FIG. 4 illustrates schematically exchanges for pairing a smart fluid meter with a relay in the automated management system.

FIG. 4 illustrates schematically exchanges making it possible to pair a smart electricity meter SM with a relay in the automated management system 100.

In a step 401, the smart fluid meter SM 140d was newly installed and for the very first time detects a triggering of metering, which represents a very first commissioning of the smart fluid meter SM 140d.

In a step 402, the smart fluid meter SM 140d switches accordingly into pairing mode.

In a step 403, the smart fluid meter SM 140d reawakens its communication interface compatible with the communication network SR_NET 103 and sends at least one announcement frame via said interface. The announcement frame identifies the smart fluid meter SM 140d and notifies the fact that the smart fluid meter SM 140d is in pairing mode. Preferentially, the smart fluid meter SM 140d transmits such announcement frames at regular intervals, for example every 5 minutes, while remaining awake during a predefined period, for example 5 seconds, to leave the opportunity for a response of a relay. By way of illustration, the relay REL 130 not being in pairing mode at the moment when the smart fluid meter SM 140d sends at least one announcement frame at the step 403, the predefined period expires and the smart fluid meter SM 140d puts its communication interface compatible with the communication network SR_NET 103 in sleep mode again in a step 404.

In a step 405a, the relay REL 130 detects a triggering operation via a man-machine interface of said relay REL 130. For example, the relay REL 130 comprises a button that can be actuated by a user and the relay REL 130 detects a pressing on said button, e.g. a pressing with a duration lying between a min bound T_MIN for example of 2 seconds and a max bound T_MAX for example of 10 seconds. In a variant embodiment, the relay 130 comprises an infrared connector. For example, this infrared connector is configured to connect a sensor in accordance with IEC 62056-21, also known by the term flag sensor. Such a sensor makes it possible to connect an installation and maintenance terminal communicating by infrared signals via said sensor. The triggering can then be done by the installation terminal, and be communicated to the relay REL 130 via the flag sensor and the infrared connector. Then, in a step 406, the relay REL 130 activates the pairing mode.

As illustrated on FIG. 4, the activation of the pairing mode by the relay REL 130 can also follow a relay selection by the gateway GW 120*a* in a step 405*b*. The smart fluid meter SM selected as relay then receives a message from the gateway GW 120*a* via the communication network LR_NET 102, by means of which the gateway GW 120*a* instructs the smart fluid meter SM to activate its relay functionality (e.g. when the smart fluid meter SM 140*d* becomes the relay REL 130), which causes the activation of the pairing mode in the step 406. The relay REL 130 then awaits receiving one or more announcement frames via the communication network SR_NET 103.

In a step 407, the smart fluid meter SM 140*d* reawakens its communication interface compatible with the communication network SR_NET 103 and once again sends at least one announcement frame via said interface, typically after a predetermined sleep period has expired. At least one announcement frame is thus received by the relay REL 130, which is at that moment in pairing mode.

In a step 408, the relay REL 130 sends a message to the information system IS via the gateway GW 120*a* to declare the connection of the smart fluid meter SM 140*d* (identified by the announcement frame received) and to request any configuration information relating to the smart fluid meter SM 140*d*, such as for example one or more encryption keys to be used in communications with the smart fluid meter SM 140*d*. In a particular embodiment, the relay REL 130 fulfils a role of proxy and behaves as if the smart fluid meters SM 140*d* that are paired with it were co-located in the relay 130.

In a step 409, the information system IS 110 processes the message sent by the relay REL 130 declaring the connection of the smart fluid meter SM 140*d*. Preferentially, the information system IS 110 retrieves configuration information, such as the encryption key or keys to be used in communications with the smart fluid meter SM 140*d*, and sends it in return to the relay REL 130. The relay REL 130 uses the configuration information obtained from the information system IS 110 to configure itself and/or to configure the smart fluid meter SM 140*d*.

In a step 410, the relay REL 130 sends a pairing validation frame to the smart fluid meter SM 140*d*, in response to the announcement frame. The pairing validation frame may contain configuration information to be applied. The smart fluid meter SM 140*d* is then informed of the success of the pairing with the relay REL 130.

In a step 411, the relay REL 130 sends a synchronisation frame to the smart fluid meter SM 140*d*. The synchronisation frame contains current time information (for example in hours, minutes and seconds) and wake-up time information (for example also in hours, minutes and seconds). The relay REL 130 thus provides the time synchronisation of the smart fluid meter SM 140*d*. For its part, the relay REL 130 can be synchronised timewise by the gateway GW 120*a* or by the information system IS 110, or by another time reference (e.g. third-party server).

In a step 412, the smart fluid meter SM 140*d* synchronises its internal clock on the current time information contained in the synchronisation frame (the transmission latency times are negligible compared with the precision of the internal clock, for example of the order of 100 milliseconds or less).

The smart fluid meter SM 140*d* programs a future emergence from sleep with the wake-up time information contained in the synchronisation frame. And the smart fluid meter SM 140*d* transmits an acknowledgement frame to the relay REL 130.

In a step 413, the smart fluid meter SM 140*d* leaves the pairing mode and switches into nominal mode, in which said smart fluid meter SM 140*d* transmits metering index readings, in time windows defined by the relay REL 130 by means of the synchronisation frames (see below in relation to FIG. 5). The smart fluid meter SM 140*d* then puts its interface with the communication network SR_NET 103 in sleep mode.

In a step 414, the relay REL 130 deactivates the pairing mode.

In a first embodiment, the relay REL 130 deactivates the pairing mode as soon as the pairing with the smart fluid meter SM 130*d* has actually ended, i.e. when the acknowledgement frame is received at the step 412. This first embodiment is for example triggered on detection of a pressing, on the aforementioned man-machine interface button, with a duration lying between the min bound T_MIN (for example 2 seconds) and the max bound T_MAX (for example 10 seconds). This facilitates the replacement of a defective smart fluid meter SM, or the installation of a new smart fluid meter SM, within radio range of the relay REL 130. The relay activates the pairing mode only for the length of time necessary for taking into account a single smart fluid meter SM.

In a second embodiment, the relay REL 130 deactivates the pairing mode after a predetermined activation period has expired, for example after 10 minutes. The second embodiment can supplement the first embodiment. This second embodiment is for example triggered on detection of a pressing, on the aforementioned man-machine interface button, with a duration beyond the max bound T_MAX (for example of 10 seconds). This makes it possible to identify a very first installation of a smart fluid meter SM that has the ability to act as a relay. This in particular facilitates the replacement of a defective relay, and accelerates the reintegration in the automated management system 100. This is because the new relay quickly takes the place of the defective one, which may have left one or more smart fluid meters SM without a pairing solution. If the relay REL 130 makes at least one pairing before automatic switching off of the pairing mode, the relay REL 130 informs the gateway GW 120 that it has adopted the role of relay. The gateway GW 120*a* can then take account of this when it re-evaluates the configuration of the communication network LR_NET at the step 307. According to another example, this second embodiment is triggered on an instruction, coming from the gateway GW 120*a*, to activate the relay functionality (step 405*b*).

If the relay REL 130 does not have other processing operations to perform immediately, the relay REL 130 goes into sleep mode and in particular puts its interface with the communication network SR_NET 103 in sleep mode.

In a particular embodiment, when the relay REL 130 loses its connection with the gateway GW 120*a* via the communication network LR_NET 102, the relay REL 130 automatically deactivates the relay functionality, resumes its simple role of smart fluid meter SM 140*f*, and itself seeks to be paired with another relay by applying the procedure of FIG. 4 (announcement frames, etc.).

The internal resources of each relay are not infinite. Each relay knows the maximum number N of paired smart fluid meters SM that it can manage in parallel. For example, N=5.

When the actual number of paired smart fluid meters SM reaches the maximum N, then the relay REL 130 does not accept any new pairings.

Figure 5:
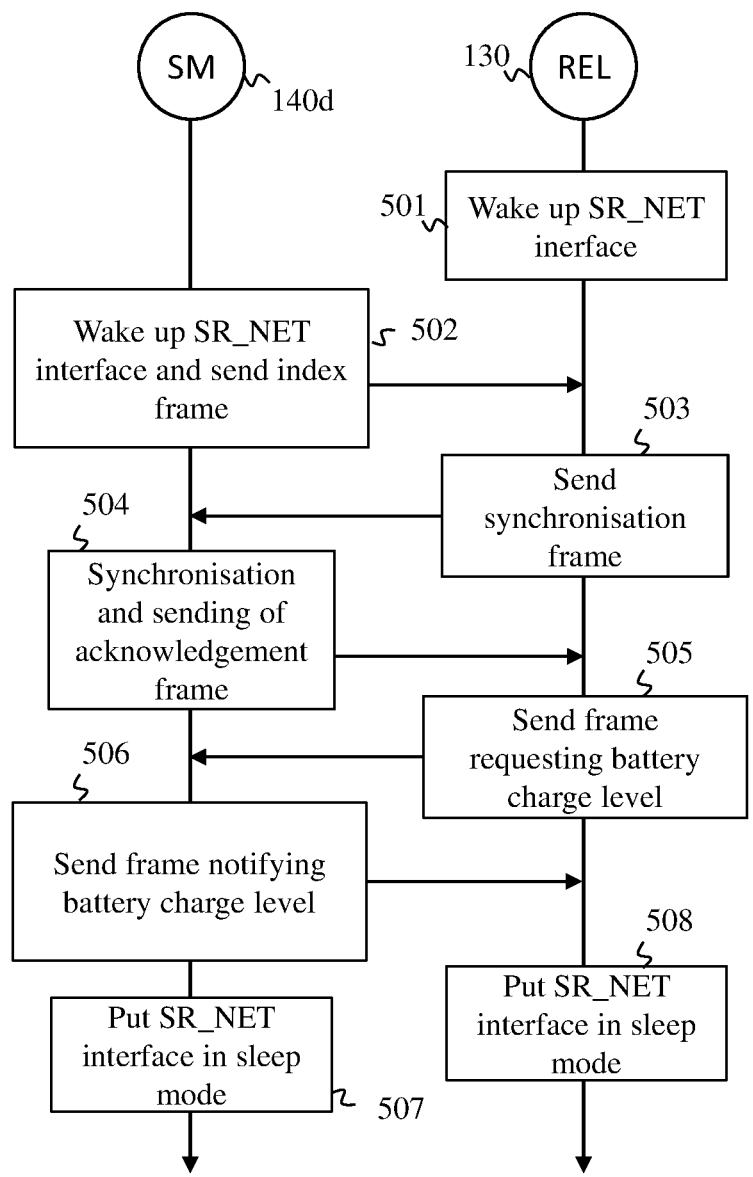
FIG. 5 illustrates schematically exchanges enabling a relay to make the meter reading on at least one smart fluid meter paired with said relay.

FIG. 5 illustrates schematically exchanges enabling a relay to make the meter reading on at least one smart fluid meter SM that is paired with it. We shall consider the illustrative case of the metering reading of the smart fluid meter SM 140d by the relay REL 130.

In a step 501, the relay REL 130 awakens its interface with the communication network SR_NET 103 and is able to receive frames from the smart fluid meters SM that are paired with it. By way of illustration, the relay REL 130 wakes up a predetermined time Δt (for example 1 second) before the supposed instant $T_0$ of waking up of the smart fluid meter SM 140d, which was programmed on reception of the very last synchronisation frame sent by the relay REL 130 to the smart fluid meter SM 140d (e.g. the steps 411 and 412). The predetermined time Δt is defined so as at least to compensate for the maximum theoretical clock drift between two successive awakenings of a smart fluid meter SM.

In a step 502, the smart fluid meter SM 140d awakens its interface with the communication network SR_NET 103 and sends to the relay REL 130 an index frame including a metering index reading made by said smart fluid meter SM 140d (typically a current index value). The relay REL 130 thus collects the metering data relating to the smart fluid meter SM 140d, in order to be able then to relay it to the information system IS 110 via the gateway GW 120a.

In a step 503, the relay REL 130 sends a synchronisation frame to the smart fluid meter 140d. As already described, the synchronisation frame contains current time information and wake-up time information. The relay REL 130 thus maintains the time synchronisation of the smart fluid meter SM 140d.

In a step 504, the smart fluid meter SM 140d synchronises its internal clock on the current time information contained in the synchronisation frame. The smart fluid meter SM 140d programmes a future emergence from sleep with the wake-up time information contained in the synchronisation frame. And the smart fluid meter SM 140d transmits an acknowledgement frame to the relay REL 130.

In an optional step 505, the relay REL 130 sends to the smart fluid meter SM 140d a frame requesting battery charge level and, in a step 506, the smart fluid meter SM 140d responds with a frame notifying battery charge level that includes coded information representing the charge level of the battery of the smart fluid meter SM 140d. This makes it possible to alert the information system SI 110, and/or the gateway GW 120a, when a low battery charge level (below a predetermined alert threshold A_TH) remains for the smart fluid meter SM 140d. The information system SI 110 can thus be alerted by the smart fluid meter SM 140d and/or by the gateway GW 120a. This aspect is addressed below in relation to FIG. 6.

In a step 507, the smart fluid meter SM 140d puts its interface with the communication network SR_NET 103 in sleep mode until the programmed instant of the next emergence from sleep. In a particular embodiment, the smart fluid meter SM 140d implements the putting in sleep mode after the expiry of a predetermined time since its awakening at the step 502, for example after 3 seconds.

If the relay REL 130 does not have any other processing operations to perform immediately, the relay REL 130 goes into sleep mode and in particular puts its interface with the communication network SR_NET 103 in sleep mode in a step 508.

The exchanges described above in relation to FIGS. 4 and 5 rely on command frames and response frames.

The command frames make it possible in particular to:
set the time of a smart fluid meter (first payload part) and to synchronise it for the next awakening (second payload part): this is the synchronisation frame (for example in the form of a command frame before an operational code in a byte equal to 0x01, with 3 bytes for the first part and 3 bytes for the second part);
request the battery charge level of a smart fluid meter: this is the battery charge level request frame (for example in the form of a command frame having an operational code in a byte equal to 0x02, without associated payload).

The response frames make it possible in particular:
to send an acknowledgement: this is the acknowledgement frame (for example in the form of a response frame having an operational code in a byte equal to 0x01, without payload);
to send a metering index reading of the smart fluid meter in question: this is the index frame (for example in the form of a response frame having an operational code in a byte equal to 0x02, with 4 index-reading payload bytes);
to send the battery charge level of the smart fluid meter in question: this is the battery charge level notification frame (for example in the form of a response frame having an operational code in a byte equal to 0x03, with 1 battery-charge level payload byte).

Figure 6:
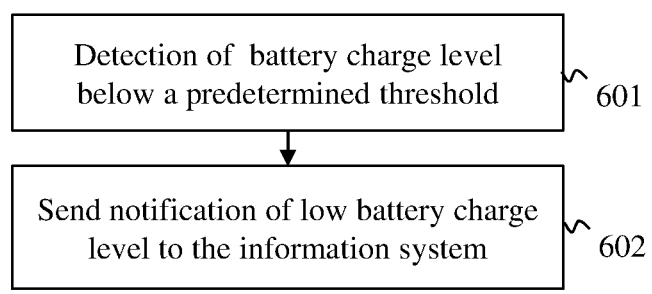
FIG. 6 illustrates schematically an algorithm, implemented by the gateway, for notifying an alert to an information system of the automated management system.

FIG. 6 illustrates schematically an algorithm, implemented by each gateway such as the gateway GW 120a, for notifying an alert to an information system IS 110.

In a step 601, the gateway GW 120a detects that a smart fluid meter SM has a low battery charge level (below the alert threshold A_TH). The gateway GW 120a knows at regular intervals the battery charge levels of the smart fluid meters SM that are directly connected to it by the communication network LR_NET 102 (step 306), including those acting as relays. For the other smart fluid meters SM that are not connected to the communication network LR_NET 102, their battery charge levels can be communicated by the relays that previously collected them (step 506).

In a step 602, the gateway GW 120a sends to the information system SI 110 an alert notifying a low battery charge level for the smart fluid meter SM in question and that an action on site is desirable (replacement or recharging of the battery). Maintenance of the automated management system 100 is improved thereby.

The algorithm in FIG. 6 can also be implemented by the relays of the automated management system 100, which then notify the information system IS 110, or notify the gateway GW 120a, which in its turn notifies the information system IS 110.

Figure 7:
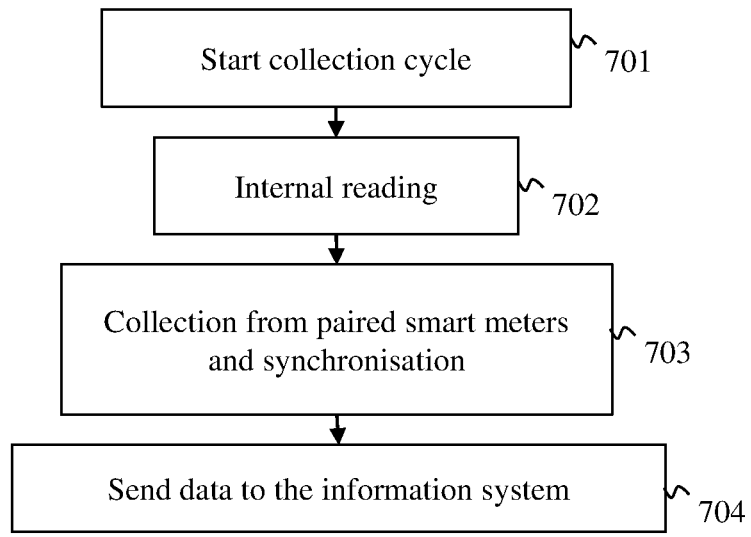
FIG. 7 illustrates schematically an algorithm, implemented by each relay, for transferring metering reading data to the information system.

FIG. 7 illustrates schematically an algorithm, implemented by each relay such as the relay REL 130, for transferring metering reading data to the information system IS 110.

In a step 701, the relay REL 130 awakens and starts a collecting cycle.

In a step 702, the relay REL 130 makes an internal reading of the metering index (relay REL 130 in its basic function of smart fluid meter SM).

In a step 703, the relay REL 130 collects, from each smart fluid meter SM that is paired with it, a metering index reading made by said smart fluid meter SM. The relay REL 130 preferentially collects, from each smart fluid meter SM which is paired with it, the battery charge level of said smart fluid meter SM. The relay REL 130 resets the time of each smart fluid meter SM that is paired with it and programmes its next awakening. The exchanges take place as already described in relation to FIG. 5.

The relay REL 130 defines at which instants the smart fluid meters SM that are paired with it wake up. The relay REL 130 can thus ensure that the smart fluid meters SM that are paired with it wake up during distinct time windows, in order to limit the transmission interferences. In a particular embodiment, the relay REL 130 implements collection cycles where the smart fluid meters SM that are paired with it wake up during consecutive time windows separated in time by 2*Δt to take into account the clock drifts. At the end of the processing of a collection cycle, the relay REL 130 can implement a putting in sleep mode until the next collection cycle.

In a particular embodiment, in the case where the relay REL 130 has not succeeded in collecting the index reading of a smart fluid meter SM that is paired with it, the relay REL 130 reattempts at the next collection cycle. After a certain number of unsuccessful attempts, the relay REL 130 considers that the communication with the smart fluid meter SM in question has been broken. The relay REL 130 then excludes it from the next collection cycles. Either a pairing is possible and the smart fluid meter SM will find another relay (see FIG. 8), or the smart fluid meter SM requires an action on site (repair, replacement).

In a step 704, the relay REL 130 sends the index readings collected at the steps 702 and 703 to the information system IS 110. The relay REL 130 can send the index readings collected at the steps 702 and 703 to the gateway GW 120*a*, which sends them in its turn to the information system IS 110. Preferentially, the relay REL 130 also sends to the gateway GW 120*a* its battery charge level, as well as the battery charge level of each smart fluid meter SM that is paired with it.

Next the relay REL 130 can implement a putting in sleep mode until the next collection cycle. A very narrow period of time at each collection cycle is thus necessary, both at the relay and at the paired smart fluid meters SM.

Figure 8:
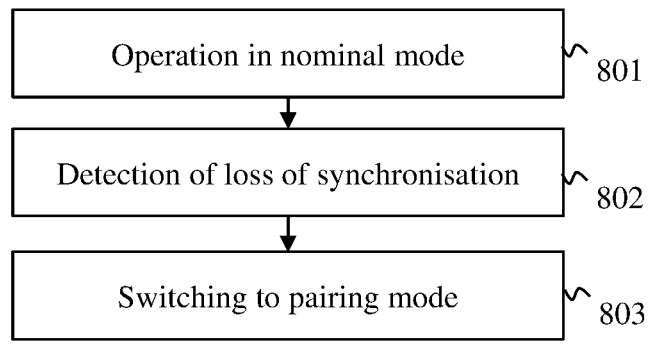
FIG. 8 illustrates schematically an algorithm, implemented by each smart fluid meter, for re-pairing in the event of loss of synchronisation.

FIG. 8 illustrates schematically an algorithm, implemented by each smart fluid meter SM, for re-pairing in the event of loss of synchronisation.

In a step 801, the smart fluid meter SM in question is paired with a relay and operates in nominal mode.

In a step 802, the smart fluid meter SM in question detects a loss of synchronisation, i.e. that a period of a duration greater than a predetermined threshold SYNC_TH (for example of 8 minutes) has elapsed since the last time setting by the relay with which said smart fluid meter SM is paired. In loss of synchronisation, the smart fluid meter SM in question must once again find a relay.

Then, in a step 803, the smart fluid meter SM emerges from nominal mode, switches into pairing mode and applies the procedure in FIG. 4 (announcement frames etc.). In the case of a replacement of a defective relay, each smart fluid meter SM that is paired with it thus automatically switches into pairing mode until the new relay is in service, as already described above.

Figure 9:
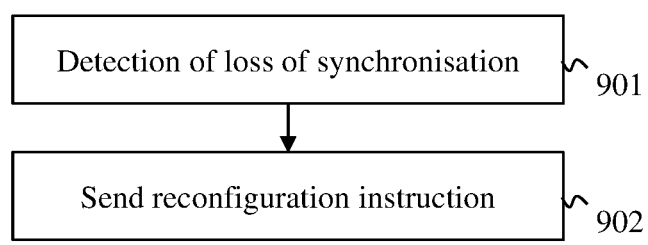
FIG. 9 illustrates schematically an algorithm, implemented by the information system, for reconfiguring the gathering network.

FIG. 9 illustrates schematically an algorithm, implemented by the information system IS 110, for reconfiguring the communication network LR_NET 102, or by the gateway GW 120*a*.

In a step 901, the information system IS 110 or the gateway GW 120*a* detects a loss of synchronisation with a smart fluid meter SM. For example, the information system IS 110 or the gateway GW 120*a* has not received a metering index reading for the smart fluid meter SM in question since a number of collection cycles above a predetermined threshold C_TH.

In a step 902, the information system IS 110 or the gateway GW 120*a* forces a reconfiguration of the communication network LR_NET 102 so as to attempt to resynchronise the smart fluid meter SM in question (which must have switched into pairing mode if it is not defective, see FIG. 8). The information system IS 110 sends a reconfiguration instruction to the gateway GW 120*a*. In this case, or if the gateway GW 120*a* implements the algorithm in FIG. 9, the gateway re-evaluates the configuration of the communication network LR_NET as at the step 307 in order to once again select suitable relays.

When a relay is confirmed in its role of relay after re-evaluation of the configuration of the communication network LR_NET by the gateway GW 120*a*, the latter informs the relay in question of this, which then switches into pairing mode (see the step 405*b*) in order to enable, as required, one or more smart fluid meters SM that will no longer be paired to be taken over by said relay.

The invention claimed is:

1. A method for configuring a communication network by a gateway acting as an intermediary between a plurality of smart fluid meters and an information system responsible for collecting metering index readings made by said smart fluid meters, wherein the gateway performs the following steps:
   obtaining, via a second radio communication network, battery charge levels of first smart fluid meters, the gateway being connected to the information system by a first communication network, the gateway being connected to the first smart fluid meters among said plurality by means of the second radio communication network, said first smart fluid meters being configured to act as relays for second smart fluid meters by means of a third radio communication network separate from the second radio communication network;
   selecting one or more first smart fluid meters as relays between the second and third communication networks, according to the battery charge levels obtained, favouring the first smart fluid meters the battery charge level of which is the highest;
   configuring the second radio communication network, instructing the first smart fluid meters selected as relays to activate their relay functionality and instructing any former relays that have not once again been selected as relays to deactivate their relay functionality, and when at least one said former smart fluid meter that has deactivated its relay functionality detects at least one smart fluid meter within range thereof is isolated and is no longer paired, the at least one said former smart fluid meter in question that has deactivated its relay functionality reactivates its relay functionality;
   monitoring the battery charge levels of the first smart fluid meters and re-evaluating the configuration of the second radio communication network accordingly.

2. The method according to claim 1, wherein the gateway selects as relay each first smart fluid meter the battery charge level of which is higher than a first predetermined threshold.

3. The method according to claim 1, wherein the gateway performs the following steps:
   making, during exchanges with the first smart fluid meters via the second radio communication network, measurements of reception quality of signals coming from the first smart fluid meters;
   selecting one or more first smart fluid meters as relays, according furthermore to the measurements of reception quality of signals made, favouring the first smart fluid meters for which the signal reception quality is the highest;

monitoring the reception quality of signals transmitted by the first smart fluid meters in the second radio communication network, and re-evaluating the configuration of the second radio communication network accordingly.

4. The method according to claim 3, wherein the gateway selects as relays each first smart fluid meter for which the quality of reception of signals by the gateway is above a second predetermined threshold.

5. The method according to claim 1, wherein the second smart fluid meters are paired with the first smart fluid meters acting as relays for said second smart fluid meters, performing the following steps:

each second smart fluid meter, in a pairing mode, sends announcement frames until a response is received from a first smart fluid meter acting as relay;

each first smart fluid meter acting as relay in pairing mode and within radio range of the third radio communication network responds to at least one announcement frame received and pairs with the second smart fluid meter that sent the announcement frame responded to.

6. The method according to claim 5, wherein at least a said second smart fluid meter switches into pairing mode when a triggering of metering is detected for the very first time.

7. The method according to claim 5, wherein at least one said second smart fluid meter switches into pairing mode following a loss of synchronisation with a previous relay.

8. The method according to claim 5, wherein a said relay switches into pairing mode when a pressing on a man-machine interface button of the relay in question is detected or when specific instructions are received via an infrared connector of the relay in question.

9. The method according to claim 8, wherein the detection of a pressing on the interface button during a period lying between a minimum bound and a maximum bound instructs the relay in question to switch into pairing mode so as to enable a single second smart fluid meter to pair, and the detection of a pressing on the interface button during a period greater than the maximum bound instructs the relay in question to switch to pairing mode during a predetermined period.

10. The method according to claim 5, wherein a said relay switches to pairing mode when instructions are received from the gateway to activate or to maintain the relay functionality.

11. The method according to claim 1, wherein each relay collects, via the third radio communication network, the battery charge level of each second smart fluid meter that is paired with it and informs the gateway of this, the gateway alerting the information system when the battery charge level of a smart fluid meter is below a predetermined alert threshold.

12. The method according to claim 1, wherein the at least one said former smart fluid meter that has reactivated its relay functionality enables the at least one isolated smart fluid meter to make a pairing and warns the gateway that it is once again acting as a relay.

13. The method according to claim 1, wherein, when a relay loses its connection with the gateway via the second radio communication network, the relay in question automatically deactivates the relay functionality, resumes its simple role of a smart fluid meter, and itself seeks to be paired with another relay.

14. The method according to claim 1, wherein the second radio communication network is a first wide area network (WAN), wherein the third radio communication network is a second WAN separate from the first WAN.

15. A non-transitory information storage medium storing instructions for implementing the method according to claim 1, when said instructions are read from the information storage medium and implemented by a processor.

16. A gateway configured for acting as an intermediary between a plurality of smart fluid meters and an information system responsible for collecting metering index readings made by said smart fluid meters, the gateway comprising electronic circuitry configured for:

obtaining, via a second radio communication network, battery charge levels of first smart fluid meters, the gateway being configured for being connected to the information system by a first communication system and for being connected to the first smart fluid meters among said plurality by means of the second radio communication network, said first smart fluid meters being able to act as relays for second smart fluid meters in said plurality by means of a third radio communication network;

selecting one or more first smart fluid meters as relays between the second and third communication networks, according to the battery charge levels obtained, favouring the first smart fluid meters the battery charge level of which is the highest;

configuring the second radio communication network, instructing the first smart fluid meters selected as relays to activate their relay functionality and instructing any former relays that have not once again been selected as relays to deactivate their relay functionality and when at least one said former smart fluid meter that has deactivated its relay functionality detects at least one smart fluid meters within range thereof is isolated and is no longer paired, the at least one said former smart fluid meter in question that has deactivated its relay functionality reactivates its relay functionality;

monitoring the battery charge levels of the first smart fluid meters and re-evaluating the configuration of the second radio communication network accordingly.

17. The gateway according to claim 16, wherein the second radio communication network is a first wide area network (WAN), wherein the third radio communication network is a second WAN separate from the first WAN.

18. An automated management system for collecting metering index readings made by smart fluid meters in said system, the system further comprising an information system and a gateway according to claim 16.

19. A system for configuring a communication network, the system comprising:

a first communication network;

a second radio communication network;

a third radio communication network;

a gateway acting as an intermediary between a plurality of smart fluid meters and an information system responsible for collecting metering index readings made by said smart fluid meters, the gateway being connected to the information system by the first communication network, the gateway being connected to first smart fluid meters among said plurality by means of a second radio communication network, said first smart fluid meters being able to act as relays for second smart fluid meters by means of the third radio communication network, wherein the gateway performs the following steps:

obtaining, via the second radio communication network, battery charge levels of the first smart fluid meters;

selecting one or more first smart fluid meters as relays, according to the battery charge levels obtained, favouring the first smart fluid meters the battery charge level of which is the highest;

configuring the second radio communication network, instructing the first smart fluid meters selected as relays to activate their relay functionality and instructing any former relays that have not once again been selected as relays to deactivate their relay functionality, and when at least one said former smart fluid meter that has deactivated its relay functionality detects at least one smart fluid meter within range thereof is isolated and is no longer paired, the at least one said former smart fluid meter in question that has deactivated its relay functionality reactivates its relay functionality;

monitoring the battery charge levels of the first smart fluid meters and re-evaluating the configuration of the second radio communication network accordingly.

* * * * *